March 19, 1929.   F. W. HORSTKOTTE   1,705,569
LUMBER GRADING MACHINE
Filed Oct. 12, 1927   2 Sheets-Sheet 1
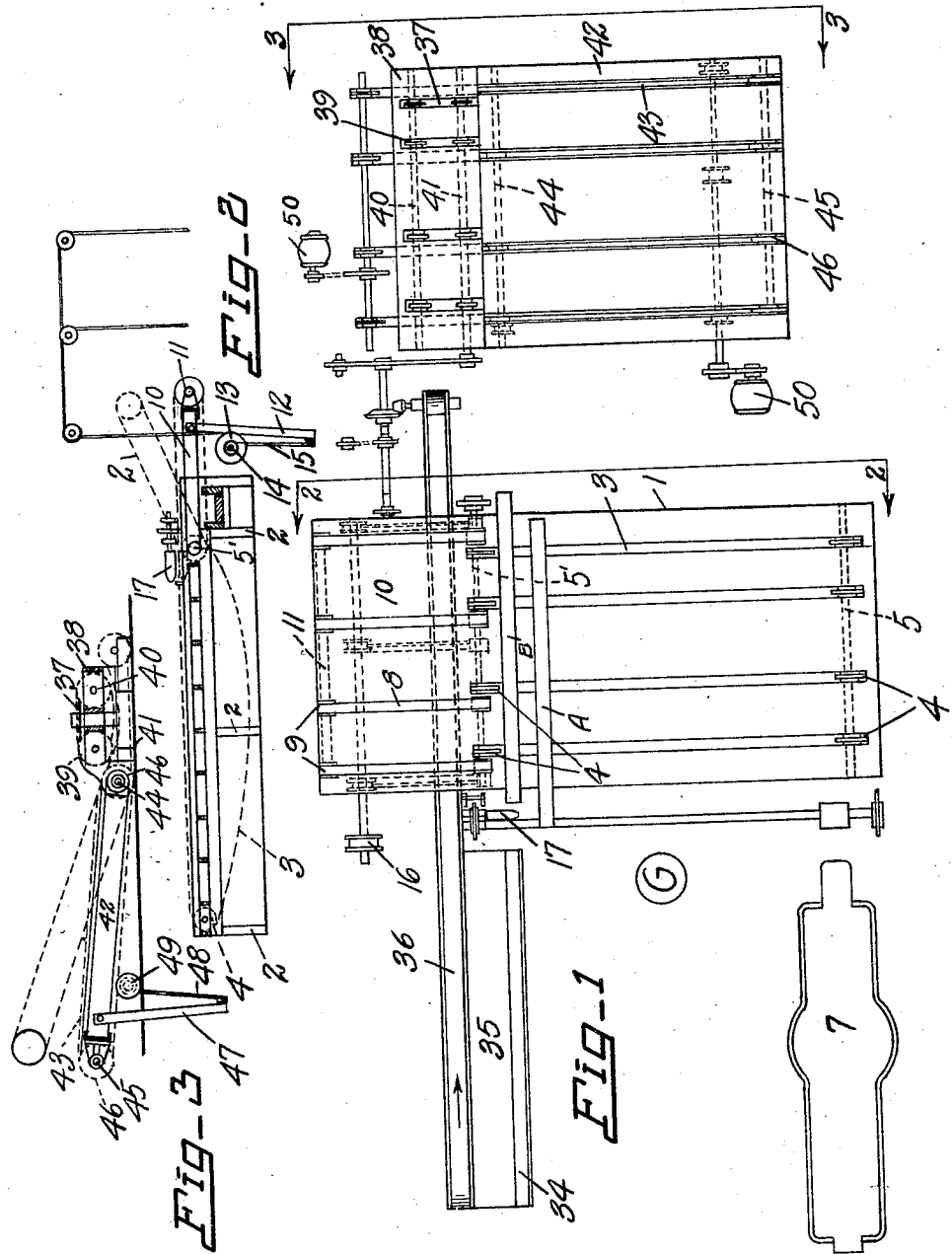
Inventor
Frederick W. Horstkotte
By Herbert C. Smith
Attorney

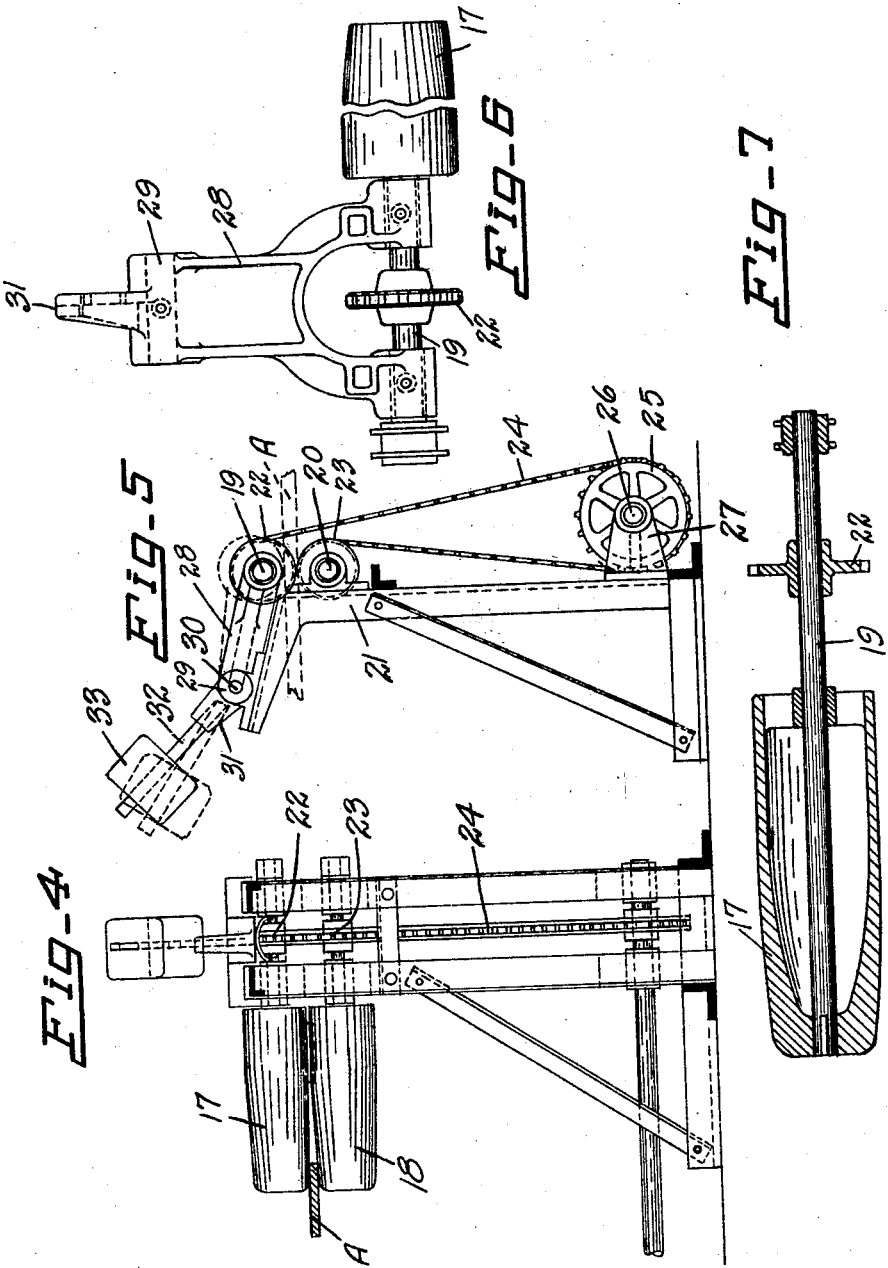

Patented Mar. 19, 1929.

1,705,569

UNITED STATES PATENT OFFICE.

FREDERICK W. HORSTKOTTE, OF PORTLAND, OREGON.

LUMBER-GRADING MACHINE.

Application filed October 12, 1927. Serial No. 225,741.

My present invention relates to a lumber grading machine adapted for use in lumber mills and other woodworking factories.

During the process of manufacturing lumber under usual conditions, it is frequently necessary to separate the boards or planks into different classes or grades, and the usual custom now employed in lumber mills is for a grader to inspect and mark the grade of a board on the board as the latter passes the inspector, and then a second man is employed to remove or dispose of the undesirable material.

In carrying out my invention, the boards or planks are fed edgewise and as they pass the inspector or grader he manually shifts a plank or board, to position where the board or plank will be fed endwise away from the transfer table or conveying mechanism. In this manner, one man is enabled to separate a specific grade of planks or boards from the material being fed through a machine.

The invention consists in certain novel combinations and arrangements of parts as will hereinafter be more fully set forth and claimed.

In the accompanying drawings, I have illustrated one complete example of the physical embodiment of my invention in connection with woodworking machinery that is adapted to receive the lumber from the matcher or other milling machine, and the completed lumber is graded and the undesirable lumber separated, before the material is delivered to the stack or pile, or loaded upon cars or trucks.

Figure 1 is a plan view showing the conveying mechanism of a milling machine to which the completed plank or board is delivered;

Fig. 2 is a sectional view at line 2—2 of Fig. 1;

Fig. 3 is an end view at line 3—3 of Fig. 1;

Fig. 4 is a view in elevation showing the two gripping rolls and their operating mechanism;

Fig. 5 is a side view of the mechanism of Fig. 4;

Fig. 6 is a top plan view of the upper gripping roll and its tiltable frame; and Fig. 7 is a sectional detail view of one of the gripping rolls.

In order that the general arrangement and relation of parts may readily be understood, I have indicated in Fig. 1 by the letter G the position where the grader stands in order that he may manually shift the lumber, as a plank A in order that this plank may be eliminated from the material as it is being fed over the feed table 1. This feed table is adapted for use in sorting or grading the lumber, and is provided with usual legs 2. A series of endless conveyer belts or chains 3 extend longitudinally of the table 1 and are supported upon rollers or sprocket wheels 4 of the spaced shafts 5 and 5' which are journaled in bearings on this grading table 1.

The boards A and B are fed to the table endwise from the fast fed matcher 7 at one side of the table, and the boards are carried edgewise across the table 1 by the conveyers 3. The grader inspects the boards as they successively pass him and the acceptable boards B continue to move edgewise under action of endless belts or chains 8 forming conveyers and supported on pulleys or wheels 9. This conveyer including the endless chains or belts 8 are supported in a buggy or frame 10, and the shaft 11 coacts with the shaft 5' as the operating means for the conveyers. The buggy or conveyer is adapted to be tilted on the shaft 5' as a pivot, in order that the outer free end of the buggy may be adjusted for delivering the boards to a stack or for delivering them to a car or truck. For this purpose, a usual lifting link 12 is provided beneath the tiltable buggy, and a drum 13 on the shaft 14 winds the cable 15, which is attached at the lower end of the link 12, to lift the buggy or tiltable conveyer to dotted line position in Fig. 2. Any suitable means may be employed as the drive pulley 16 for operating the lifter, and this mechanism forms an accessory only of the invention as herein disclosed.

Returning to Fig. 1, when the inspector or grader discovers an undesirable board A, he manually shifts the board longitudinally from the position of board B to that of board A in order that the projecting end of the board A may be gripped by a pair of rollers 17 and 18 when the board A which is being fed edgewise, reaches the position of the board B in Fig. 1.

Thus one end of the board A is carried into position between the outer or free ends of the rolls 17 and 18, as indicated in Fig. 4. These rolls 17 and 18 of course are revolved in opposite directions, and are provided with shafts 19 and 20, respectively, journaled in suitable bearings in the frame 21. The shafts are provided with sprocket wheels 22 and 23 over which a sprocket chain 24 passes and this chain is driven from the base of the machine by a drive sprocket 25 on the drive shaft 26 which is journaled in a bearing bracket 27.

The upper roll 17 is counterweighted or counterbalanced in order that it may move to receive the board, and in order that the two gripping rollers may frictionally engage the upper and lower faces of the board to feed it endwise. Thus the upper roller and its shaft are journaled in a tiltable frame 28 which is fashioned in the form of a bearing yoke and the bearing sleeve 29 of this yoke is pivoted at 30 on the frame 21. The yoke has a bracket 31 integral therewith to which a bracket arm 32 is attached, and the adjustable weight 33 is carried near the end of this bracket arm.

Referring to Fig. 1, as the board A is fed endwise between the gripping rollers, it is deposited on a receiving platform 34, and then moves edgewise down an inclined chute 35, into a trough 36. The board A now moves endwise under the buggy 10, and is deposited upon a conveyer frame or buggy including belts 37 supported in the frame 38 on rollers 39 which are revolvable with their shafts 40 and 41. The boards A are fed edgewise by these conveyer belts 37 and deposited on the tiltable frame 42 which is provided with a series of conveyer belts or endless chains 43. These shafts 44 and 45 are provided with wheels or pulleys 46 for the conveyers 43 and these boards A are delivered from these conveyer belts 43 and may be again treated to correct any defects, or they may be stored or stacked for future use. The frame 42 and its conveyer, as indicated in Fig. 3, is also tiltable to adapt and adjust the conveyer for the increasing height of a stack of lumber, or to adapt the conveyer for other purposes. The tilting frame is provided with a lifting link 47 having a cable 48 that passes around the drum 49, and when the drum is revolved of course the tiltable frame is elevated or lowered as indicated by dotted lines in Fig. 3.

An electric motor 50 is illustrated in Fig. 1 for driving parts of the machinery, and it will be understood that other accessories necessary for complete installation of machinery are provided, although not herein shown.

Various changes and alterations may be made in the machinery as herein illustrated where the practical application of the invention is shown behind a fast fed planing mill machine, and it will be understood that the part of the machinery involving my invention may be utilized in connection with other types of conveying machinery that are employed in lumber mills and in other similar plants.

Having thus fully described my invention, what I claim as new and desire to secure by Letters Patent is—

1. The combination with a grading table and a lumber conveyer thereon whereby the boards are moved successively, of a feed mechanism disposed at an angle to the conveyer mechanism and located in the path of movement of and adapted to receive offset boards that have been shifted with relation to the feed of the lumber.

2. The combination with a conveyer for moving lumber edgewise, of a pair of gripping rolls arranged at one side of the conveyer in the path of movement of and adapted to receive an offset board that has been shifted out of original position, whereby the board may be transferred as described.

3. The combination with a lumber conveyer for moving lumber edgewise, of a pair of feed rolls at one side of the conveyer in the path of movement of certain offset boards, said rolls being fashioned to receive and grip an offset board, and means for operating said feed rolls.

4. The combination with a grading table and endless conveyers thereon for moving lumber edgewise, of a pair of rolls in the path of movement of an offset board on the conveyers, said rollers having tapered ends to receive and grip the end of the offset board.

5. The combination with an endless conveyer for moving lumber edgewise, of a pair of angularly disposed feed rolls located at one side of the conveyer in the path of movement of an offset board on the conveyer and adapted to grip said board, means for counterbalancing the upper grip roll, and means for operating said rolls.

In testimony whereof I affix my signature.

F. W. HORSTKOTTE.